US007825827B2

(12) United States Patent
Jang et al.

(10) Patent No.: US 7,825,827 B2
(45) Date of Patent: Nov. 2, 2010

(54) INTELLIGENT PARKING GUIDANCE APPARATUS AND METHOD

(75) Inventors: Byung Tae Jang, Daejeon (KR); Do Hyun Kim, Daejeon (KR); Jae Jun Yoo, Daejeon (KR); Mi-Jeong Kim, Daejeon (KR); Kyeong Tae Kim, Chuncheon (KR); Myung Hee Son, Daejeon (KR); Jae Han Lim, Daejeon (KR); Kyung Bok Sung, Daejeon (KR); Jong-Hyun Park, Daejeon (KR); Jung Sook Kim, Seoul (KR); Jeong-Dan Choi, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 263 days.

(21) Appl. No.: 11/929,830

(22) Filed: Oct. 30, 2007

(65) Prior Publication Data

US 2008/0136674 A1 Jun. 12, 2008

(30) Foreign Application Priority Data

Dec. 8, 2006 (KR) ..................... 10-2006-0125032

(51) Int. Cl.
*B60Q 1/48* (2006.01)

(52) U.S. Cl. ....................... 340/932.2; 340/933; 705/13

(58) Field of Classification Search ............. 340/932.2, 340/933, 988, 525, 528, 539.1, 539.11, 5.32, 340/5.33, 5.6; 701/202, 209; 705/13, 418, 705/1, 5, 6

See application file for complete search history.

(56) References Cited

U.S. PATENT DOCUMENTS 5,155,614 A * 10/1992 Carmen et al. .............. 398/202
5,793,309 A * 8/1998 Nellson ................... 340/932.2
6,970,101 B1 * 11/2005 Squire et al. ............. 340/932.2
7,181,426 B2 * 2/2007 Dutta .......................... 705/37
2005/0280555 A1 * 12/2005 Warner, IV .............. 340/932.2
2007/0016365 A1 1/2007 Lee et al.
2007/0061192 A1 * 3/2007 Chew .......................... 705/13
2008/0033640 A1 * 2/2008 Amano ....................... 701/209

FOREIGN PATENT DOCUMENTS

JP 09016899 A 1/1997
JP 2001222799 A 8/2001
JP 2003263662 A 9/2003

(Continued)

*Primary Examiner*—Hung T. Nguyen

(57) ABSTRACT

Provided are an intelligent parking guidance apparatus and method. The intelligent parking guidance apparatus includes: an image sensor node recognizing a vehicle number of a vehicle, sensor nodes determining whether the vehicle exists in their own positions, a parking management server generating information for guiding the vehicle to an available parking space, and a mobile communication terminal receiving the information. The intelligent parking guidance apparatus and method provide information regarding parking lots which are within a predetermined distance from a destination and available parking spaces of each parking lot, to a driver, as well as provide a road guidance service to the driver to guide his/her vehicle to the destination, so that the driver can select an optimal parking lot. Also, when the vehicle enters the parking lot, the intelligent parking guidance apparatus and method guide the driver to an available empty parking space, thereby reducing difficulties in finding a parking space in a place which is unfamiliar to the driver.

11 Claims, 7 Drawing Sheets

FOREIGN PATENT DOCUMENTS

| | | | |
|---|---|---|---|
| JP | 2004-030163 | | 1/2004 |
| JP | 2005092557 | A | 4/2005 |
| JP | 2005-190448 | | 7/2005 |
| KR | 1020050078676 | A | 8/2005 |
| KR | 10-0542730 | | 1/2006 |
| KR | 1020060033229 | A | 4/2006 |
| KR | 1020060057150 | A | 5/2006 |
| KR | 10-2006-0073414 | A | 6/2006 |
| KR | 1020060073414 | A | 6/2006 |

* cited by examiner

INTELLIGENT PARKING GUIDANCE APPARATUS AND METHOD

CROSS-REFERENCE TO RELATED PATENT APPLICATION

This application claims the benefit of Korean Patent Application No. 10-2006-0125032, filed on Dec. 8, 2006, in the Korean Intellectual Property Office, the disclosure of which is incorporated herein in its entirety by reference.

BACKGROUND OF THE INVENTION

1. Field of the Invention

The present invention relates to an intelligent parking guidance apparatus and method, and more particularly, to an intelligent parking guidance system for providing information regarding parking lots near a destination to a driver in real time to guide the driver to drive his/her vehicle to an empty parking space in a selected parking lot, as well as providing a road guidance service for driver to the driver.

This work was supported by the IT R&D program of MIC. [2006-S-024-01, Development of Telematics Application Service Technology based on USN Infrastructure]

2. Description of the Related Art

Conventional navigation programs provide a road guidance service for guiding a driver to a destination, but do not provide information regarding available parking lots near the destination nor a service for guiding the driver to an empty parking space in a selected parking lot.

Accordingly, drivers have to look for parking lots near their destination in order to park their vehicles. Also, even when the drivers find an appropriate parking lot, they may have to look for a different parking lot if there are no empty parking spaces in the appropriate parking lot.

Conventionally, there is no method in which a driver can acquire information regarding empty parking spaces when his or her vehicle enters a parking lot of a large building, a large department store, a shopping center, a large discount store, a public institution, or the like. Thus, the driver has to direct his or her vehicle relying on hand gestures of parking staff, or has to look for an empty parking space while driving around many floors of the parking lot if no parking staff are present.

Recently, in order to solve such a problem, an unmanned parking management system using a wired/wireless network has been introduced.

However, in the case of the unmanned parking management system using the wired network, if a parking lot is large, installation costs in relation to the parking lot are high and an installation process is very complicated since a vehicle sensor that are installed in each parking space, an indication light, a central processing controller, etc., need to be wired together with each other.

Also, long installation time leads to a long-time limitation in use of the parking lot.

In the case of the conventional unmanned parking management system using the wireless network, a method in which a vehicle sensor and a wireless transceiver are installed at each parking space and the wireless transceiver directly transmits data sensed by the vehicle sensor to the central processing controller, is used.

However, the method in which the wireless transceiver directly transmits data sensed by the vehicle sensor to the central processing controller, needs a high-power wireless transceiver since a wireless transceiver of each parking space must directly perform 1:1 communication with the central processing controller. The use of such a high-power wireless transceiver further increases installation costs and power consumption.

SUMMARY OF THE INVENTION

The present invention provides an intelligent parking guidance apparatus and method for providing information regarding parking lots near a destination to a driver, providing information regarding available parking spaces in real time to a navigation program before the driver enters a parking lot, and guiding the driver to an empty parking space in the parking lot, as well as providing a road guidance service to guide the driver to the destination.

According to an aspect of the present invention, there is provided an intelligent parking guidance apparatus comprising an image sensor node recognizing a vehicle number of a vehicle which enters a parking lot; a plurality of sensor nodes determining whether the vehicle enters or leaves the parking lot and whether the vehicle is parked in the parking lot; a parking management server determining whether the vehicle is a vehicle which has made an application for parking reservation service, on the basis of a sensing signal generated by the image sensor node, and generating information for guiding the vehicle to an available parking space after the vehicle enters the parking lot, on the basis of a sensing signal generated by the sensor nodes; and a mobile communication terminal providing the parking reservation service and the information for guiding the vehicle to the available parking space, to a driver of the vehicle.

According to another aspect of the present invention, there is provided an intelligent parking guidance method comprising sensing an available empty parking space in a parking lot; recognizing a vehicle number of a vehicle which enters the parking lot; determining whether the vehicle is a vehicle which has made an application for parking reservation service, on the basis of the vehicle number of the vehicle, and generating information for guiding the vehicle to the available empty parking space, on the basis of a signal indicating that the available empty parking space exists; and providing the information for guiding the vehicle to the available empty parking space, to a driver of the vehicle.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE INVENTION

Hereinafter, the present invention will be described in detail with reference to the appended drawings.

Figure 1:
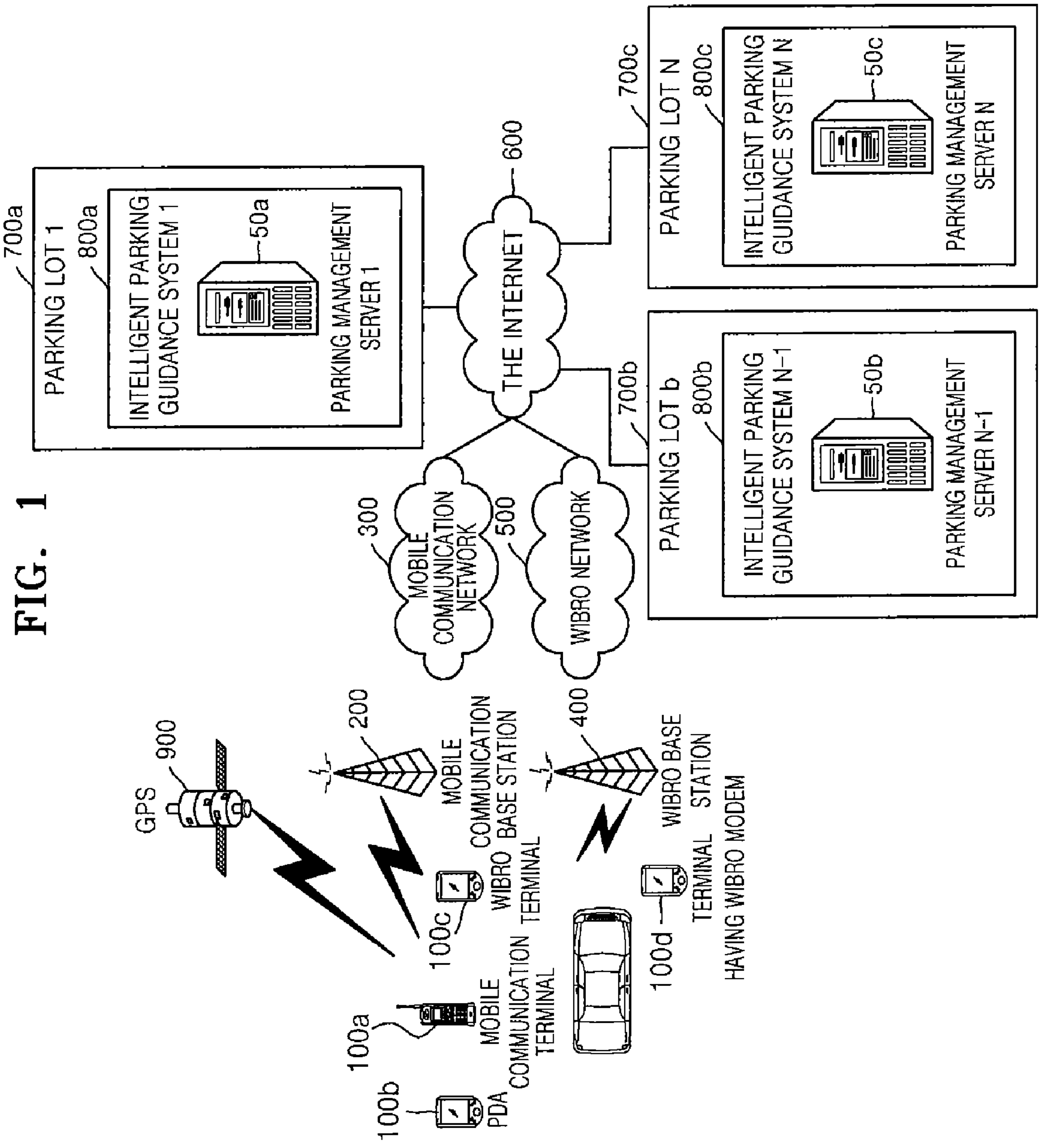
FIG. 1 illustrates an arrangement of a navigation-linked intelligent parking guidance system for providing a parking information guidance service for parking lots near a destination, according to an embodiment of the present invention.

FIG. 1 illustrates an arrangement of a navigation-linked intelligent parking guidance system for providing a parking information guidance service for parking lots near a destination, according to an embodiment of the present invention.

Referring to FIG. 1, mobile terminals, such as a mobile communication terminal 100*a*, a PDA phone 100*b* having a CDMA modem, an IMT-2000 phone, and a smart phone, or the like, can be connected to the Internet 600 through a mobile communication network 300 via a mobile communication base station 200. Also, a Wibro terminal 100*c* and a terminal 100*d* having a Wibro modem, etc. can be connected to the Internet 600 through a Wibro network 500 via a Wibro base station 400, and have been equipped with a navigation program for provide a road guidance service to drivers.

The variety of mobile communication terminals can recognize location information of a driver's vehicle on a road using a GPS satellite positioning. A variety of methods for recognizing a vehicle's location on a road have been developed and can be used.

A driver reaches a destination according to a road guidance service of a navigation program which is included in the variety of mobile communication terminals 100*a*, 100*b*, 100*c*, and 100*d*. The navigation program stores, as Point Of Interest (POI) information, location information of parking lots 700*a*, 700*b*, and 700*c*, and IP addresses of parking management servers 50*a*, 50*b*, and 50*c* of intelligent parking guidance systems 800*a*, 800*b*, and 800*c* that are respectively installed in the parking lots 700*a*, 700*b*, and 700*c*.

If the driver approaches the destination, the navigation program searches for parking lots which are within a predetermined distance from the destination, using the POI information.

The navigation program extracts IP addresses of the parking management servers 50*a*, 50*b*, and 50*c* of the intelligent parking guidance systems 800*a*, 800*b*, and 800*c* installed in the searched parking lots, using the POI information, and accesses the parking management servers 50*a*, 50*b*, and 50*c*, respectively, using the extracted IP addresses. After the navigation program accesses the parking management servers 50*a*, 50*b*, and 50*c*, the navigation program receives information regarding the parking capacity of each of the parking lots 700*a*, 700*b*, and 700*c* and currently available parking spaces of each of the parking lots 700*a*, 700*b*, and 700*c*, in real time, from the parking management servers 50*a*, 50*b*, and 50*c*.

The navigation program provides the driver with information regarding the locations of the parking lots 700*a*, 700*b*, and 700*c*, distances from the parking lots 700*a*, 700*b*, and 700*c* to the destination, and the parking capacity and currently available parking spaces of each of the parking lots 700*a*, 700*b*, and 700*c*. The driver selects a parking lot from among the parking lots 700*a*, 700*b*, and 700*c*, on the basis of the information. Then, the navigation program communicates with a parking management server of the selected parking lot, reserves a parking space, changes the destination to the reserved parking space, and then continues to provide the road guidance service to the driver.

Figure 2:
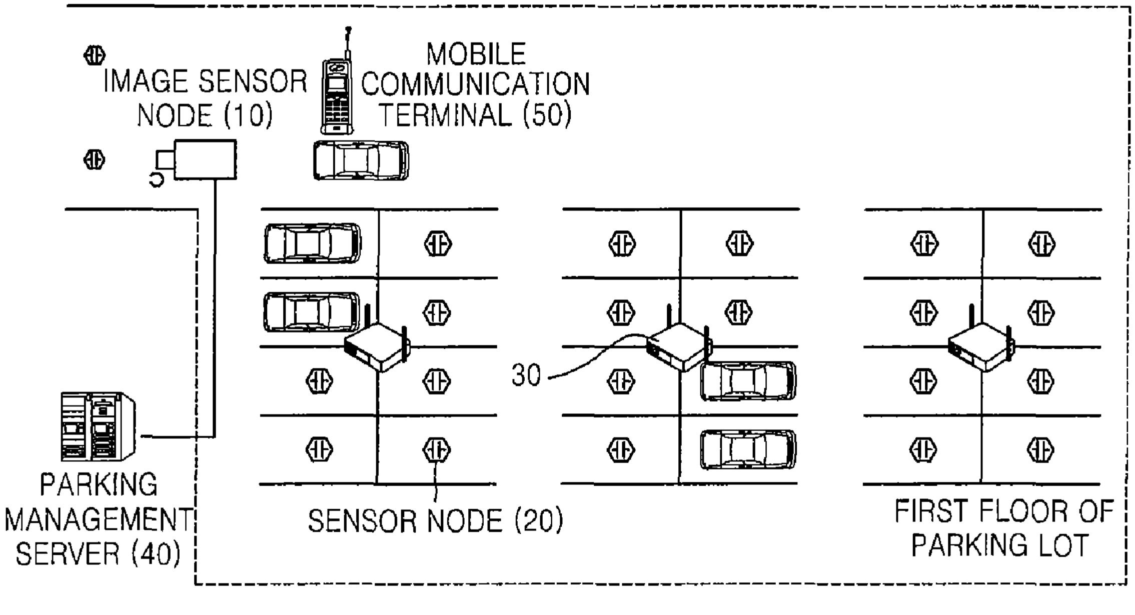
FIG. 2 illustrates an arrangement of a parking lot to which the navigation-linked intelligent parking guidance system according to the embodiment of the present invention is applied.

FIG. 2 illustrates an arrangement of a parking lot to which the navigation-linked intelligent parking guidance system 800*a* is applied.

Referring to FIG. 2, the navigation-linked intelligent parking guidance system 800*a* includes an image sensor node 10, a plurality of sensor nodes 20, a plurality of sync nodes 30, a parking management server 40, and a mobile communication terminal 50.

The image sensor node 10 is installed at an entrance road of the parking lot, and senses a number plate of a vehicle which enters the parking lot.

The sensor node 20 is installed at each parking space of the parking lot, and senses whether a vehicle occupies the parking space. Also, a sensor node 20 is installed at each of the entrance and exit roads of the parking lot, and determines whether a vehicle enters or leaves the parking lot.

The sync node 30 amplifies a signal received from the sensor node 20, and transmits the amplified signal to the parking management server 40.

The parking management server 40 communicates with the sensor node 20 through the sync node 30, and stores, analyzes, processes, manages information, and guides vehicles around the parking lot.

Since the sensor node 20 must be installed at a parking space or a passage through which vehicles pass, the sensor node 20 includes a package in which a wireless antenna is installed.

The sensor node 20 is durable so that it can support the weight of a vehicle which passes over the package of the sensor node 20. The sensor node 20 is installed at the center region of a road or a parking space in order to correctly detect a vehicle, and the sensor node 20 is installed in a manner to be stuck to the ground.

Accordingly, since the wireless antenna exists in the package of the sensor node 20 which is stuck to the ground, a communication range of the sensor node 20 is not wide.

In order to solve problems related to the narrow communication range of the sensor node 20 and transmit sensing information to the parking management server 40, the sensor node 20 transmits sensing information to a nearest sync node 30, thereafter the sync node 30 transmits the sensing information to the parking management server 40 using multi-hop routing between sync nodes 30.

The parking management server 40 communicates with a navigation program of a vehicle before the vehicle enters the parking lot, transmits parking information to a navigation program which is executed in a mobile terminal of the vehicle, and provides a parking space reservation service when a driver of the vehicle requests to reserve the parking lot.

The parking management server 40 stores the number and locations of the total parking spaces of the parking lot, the number and locations of parking spaces currently occupied by vehicles, the number of reserved parking spaces, the number of parking spaces for vehicles that are moving in the parking lot, the number and locations of currently available empty parking spaces, and a parking space reservation vehicle list, in a database (DB).

The parking management server 40 can calculate the number of currently available parking spaces, using parking space occupancy information sensed by the sensor node, which varies in real time, information regarding vehicles that enter or leave the parking lot, and information of the number of reserved parking spaces, according to Equation 1.

The number of currently available parking spaces=The Total Number of Parking Spaces−(The Number of Parking Spaces Currently Occupied By Vehicles+The Number of Reserved Parking Spaces+The Number of Parking Spaces for Vehicles That Are Moving In Parking Lot)

The parking management server 40 can recognize the locations of sensor nodes 20 using sensor node IDs since it stores sensor node IDs and a sensor node location map therein.

Figure 3A:
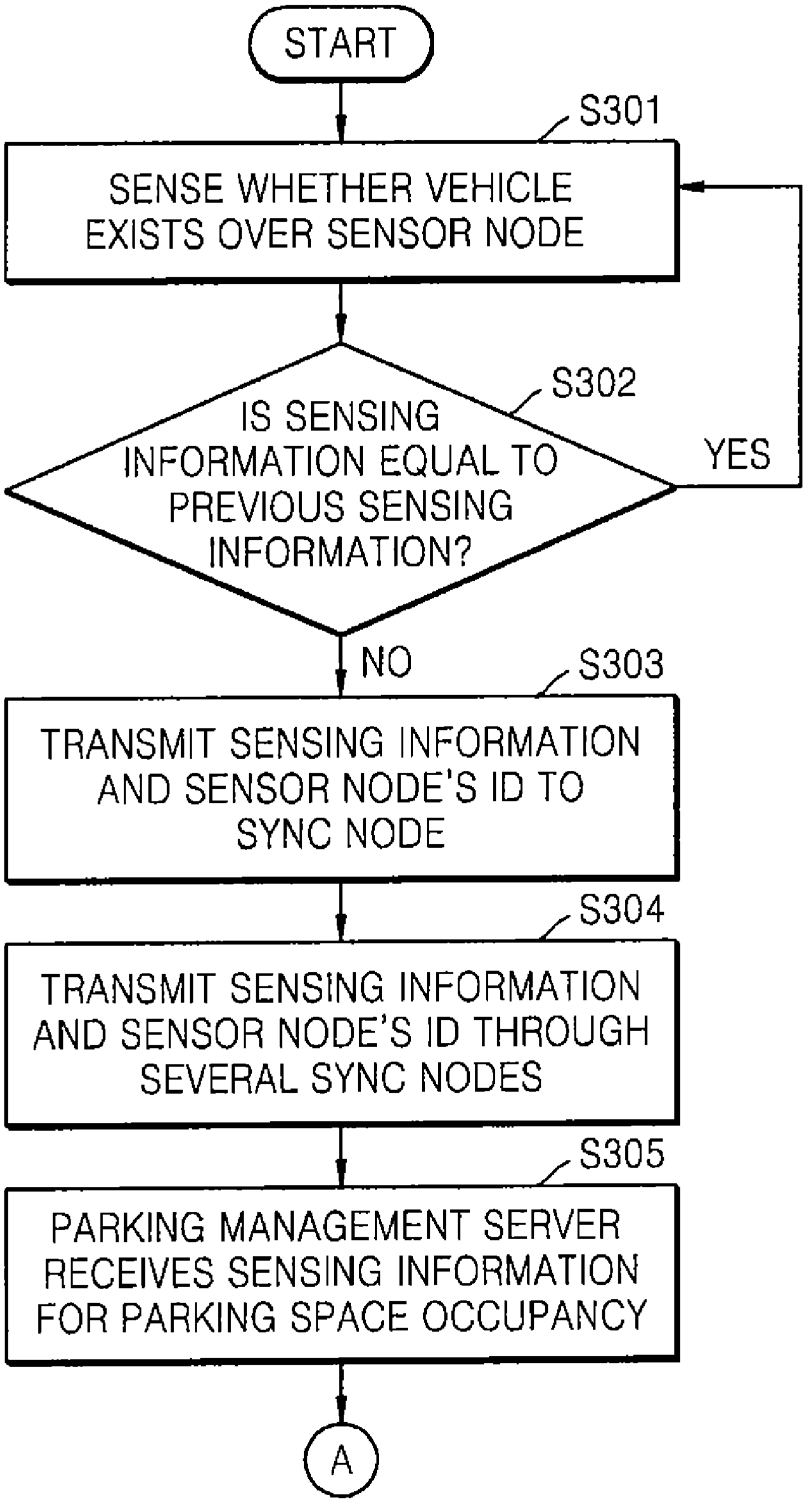
FIGS. 3A and 3B are a flowchart of a method for determining whether an available empty parking space exists in a parking lot to which the navigation-linked intelligent parking guidance system is applied, according to the embodiment of the present invention.
Figure 3B:
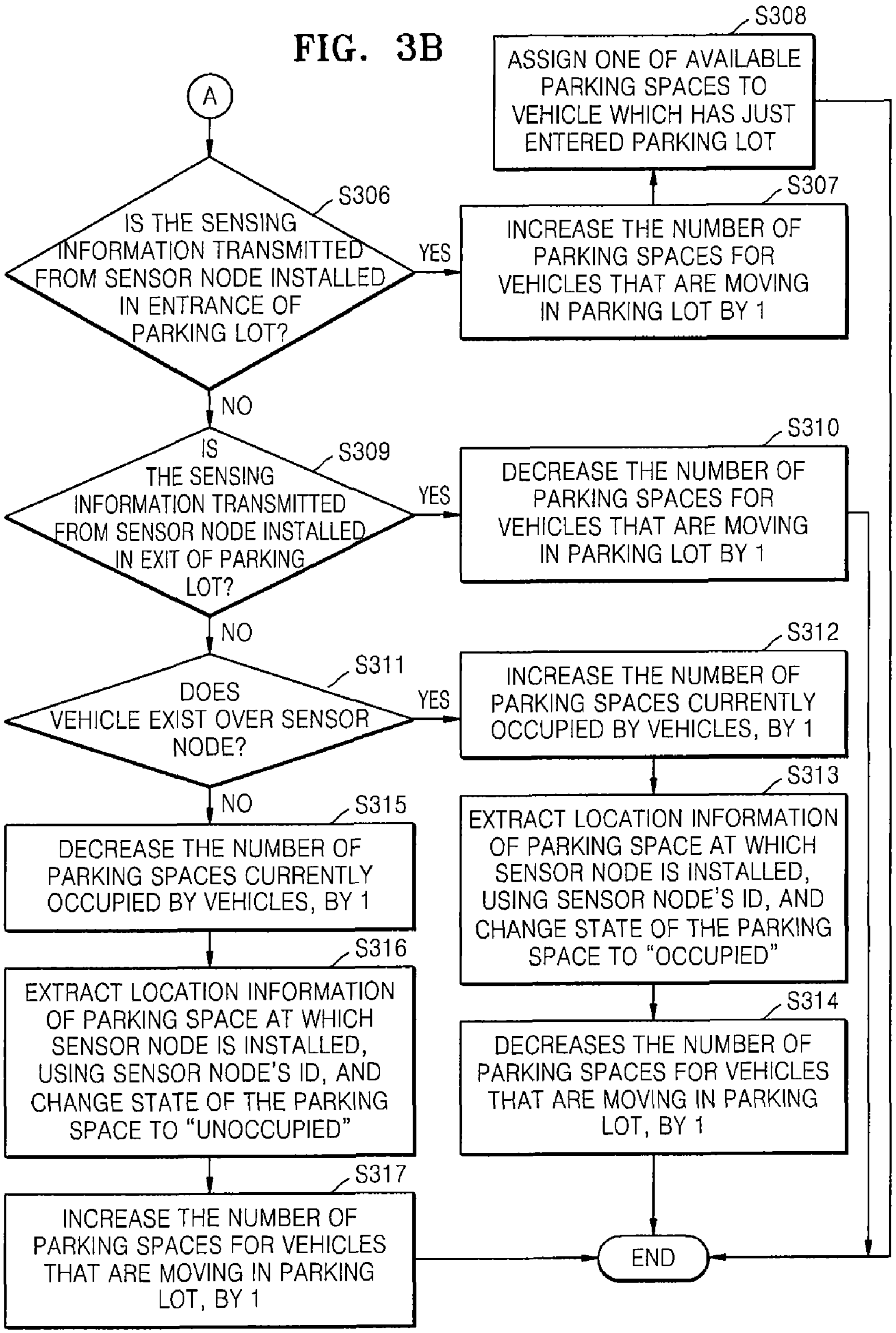

FIGS. 3A and 3B are a flowchart of a method for determining whether an available empty parking space exists in a parking lot to which the navigation-linked intelligent parking guidance system is applied, according to the embodiment of the present invention.

Referring to FIGS. 2 and 3, the intelligent parking guidance system periodically senses whether a vehicle exists at a position where each sensing node 20 is located, using sensor nodes 20 which are respectively installed at parking spaces of the parking lot and the entrance and exit roads of the parking lot, and determines whether each parking space is occupied by a vehicle and whether a vehicle exists on the entrance and exit roads of the parking lot (operation S301).

Each sensor node 20 determines whether currently acquired sensing information is the same as previous sensing information which has been acquired during the previous time interval (operation S302).

If the current sensing information is different from the previous sensing information, the sensor node 20 transmits its own ID and the current sensing information to a sync node 30 near the sensor node 20 (operation S303).

The current sensing information is transmitted to the parking management server 40 through routing of several sync nodes 30 (operation S304).

The parking management server 40 receives sensing information which is streamed in real time (operation S305).

The parking management server 40 parses the ID of the sensor node 20, and determines whether the sensing information is transmitted from a sensor node 20 installed at the entrance road of the parking lot (operation S306).

If the sensing information is a message transmitted from the sensor node 20 installed at the entrance road of the parking lot, the parking management server 40 increases the number of parking spaces for vehicles that are moving in the parking lot, which is stored in its own DB, by 1 (operation S307).

The number of currently available parking spaces automatically decreases by 1, according to the result of operation 307 and Equation 1, and the parking management server 40 assigns a parking space of the currently available parking spaces to the corresponding vehicle (operation S308).

Through the above operations, it is possible to ensure a parking space for a vehicle which is moving in the parking lot.

If it is determined in operation 306 that the sensing information is not transmitted from the sensor node 20 installed at the entrance road of the parking lot, the parking management server 40 determines whether the sensing information is transmitted from a sensor node 20 installed at the exit road of the parking lot, using sensor node IDs (operation S309).

If the sensing information is transmitted from a sensor node 20 installed at the exit road of the parking lot, the parking management server 40 decreases the number of parking spaces for vehicles which are moving in the parking lot, by 1 (operation S310).

If the sensing information is not transmitted from the sensor node 20 installed at the exit road of the parking lot, it is certain that the sensing information is transmitted from a sensor node 20 installed at a parking space. Accordingly, the parking management server 40 parses the sensing information, and determines whether a vehicle exists over a sensor node 20 installed at a parking space (operation S311).

If it is determined in operation 311 that a vehicle exists over a sensor node 20 installed at a parking space, the parking management server 40 increases the number of parking spaces currently occupied by vehicles, by 1 (operation 312).

Thereafter, the parking management server 40 extracts location information of the parking space at which the sensor node 20 is installed, using the sensor node's ID, and changes the state of the parking space corresponding to the location to "occupied" (operation 313).

Then, the parking management server 40 decreases the number of parking spaces for vehicles that are moving in the parking lot, by 1 (operation S314).

If it is determined in operation S311 that no vehicle exists over the sensor node 20, the parking management server 40 decreases the number of parking spaces currently occupied by vehicles, by 1 (operation S315).

Then, the parking management server 40 extracts location information of a parking space at which the sensor node 20 is installed, using the sensor node's ID, and changes the state of the parking space corresponding to the location to "unoccupied" (operation S316).

Then, the parking management server 40 increases the number of parking spaces for vehicles that are moving in the parking lot, by 1 (operation S317).

After operation S308, operation of providing parking lot information and path guidance information for an assigned parking space to a navigation mobile terminal of a vehicle which has just entered the parking lot can be additionally performed. The operation corresponds to operation S414 illustrated in FIG. 4C.

All the sensor nodes 20 and sync nodes 30 periodically transmit their states to the parking management server 40. When a sensor node among the sensor nodes 20 does not operate due to an error, the parking management server 40 notifies a server manager of the malfunction so that a parking lot manager can identify the erroneous sensor node and replace it with a new sensor node.

While performing sensor node management using periodical state information notification messages of the sensor nodes 20, the parking management server 40 provides a monitoring tool which can monitor the state information of the sensor nodes 20 and the sync nodes 30 according to a request of the server manager.

The sensing period of sensor nodes which are installed at the entrance and exit roads of the parking lot can be different from the sensing period of sensor nodes which are installed at parking spaces. That is, the sensor nodes which are installed at the entrance and exit roads of the parking lot must examine whether vehicles exist over the sensor nodes, more frequently than the case of the sensor nodes which are installed at the parking spaces.

Figure 4A:
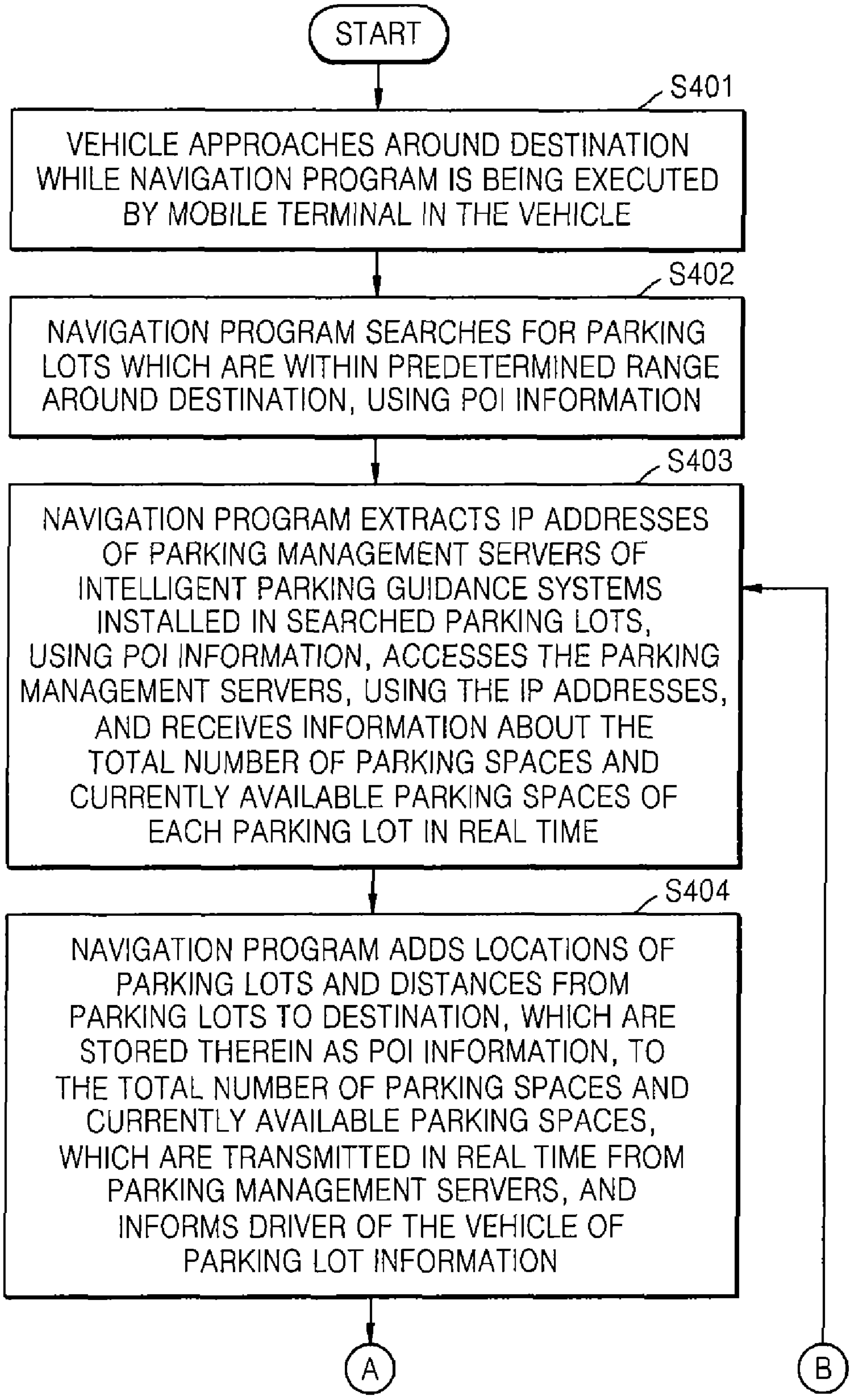
FIGS. 4A, 4B and 4C are flowcharts of a method for providing a parking space reservation service and a parking information providing service in the navigation-linked parking guidance system, according to the embodiment of the present invention.
Figure 4B:
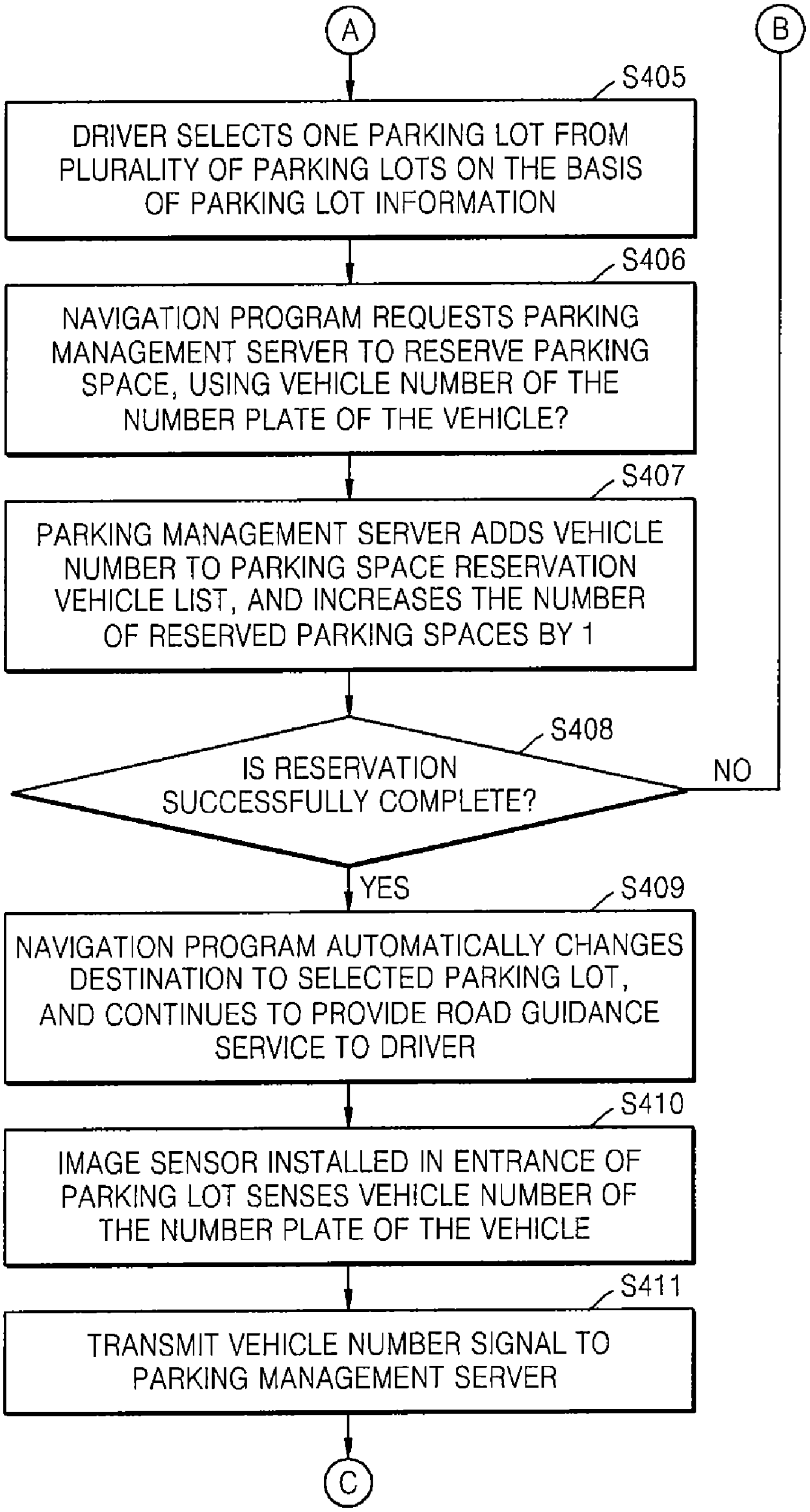
Figure 4C:
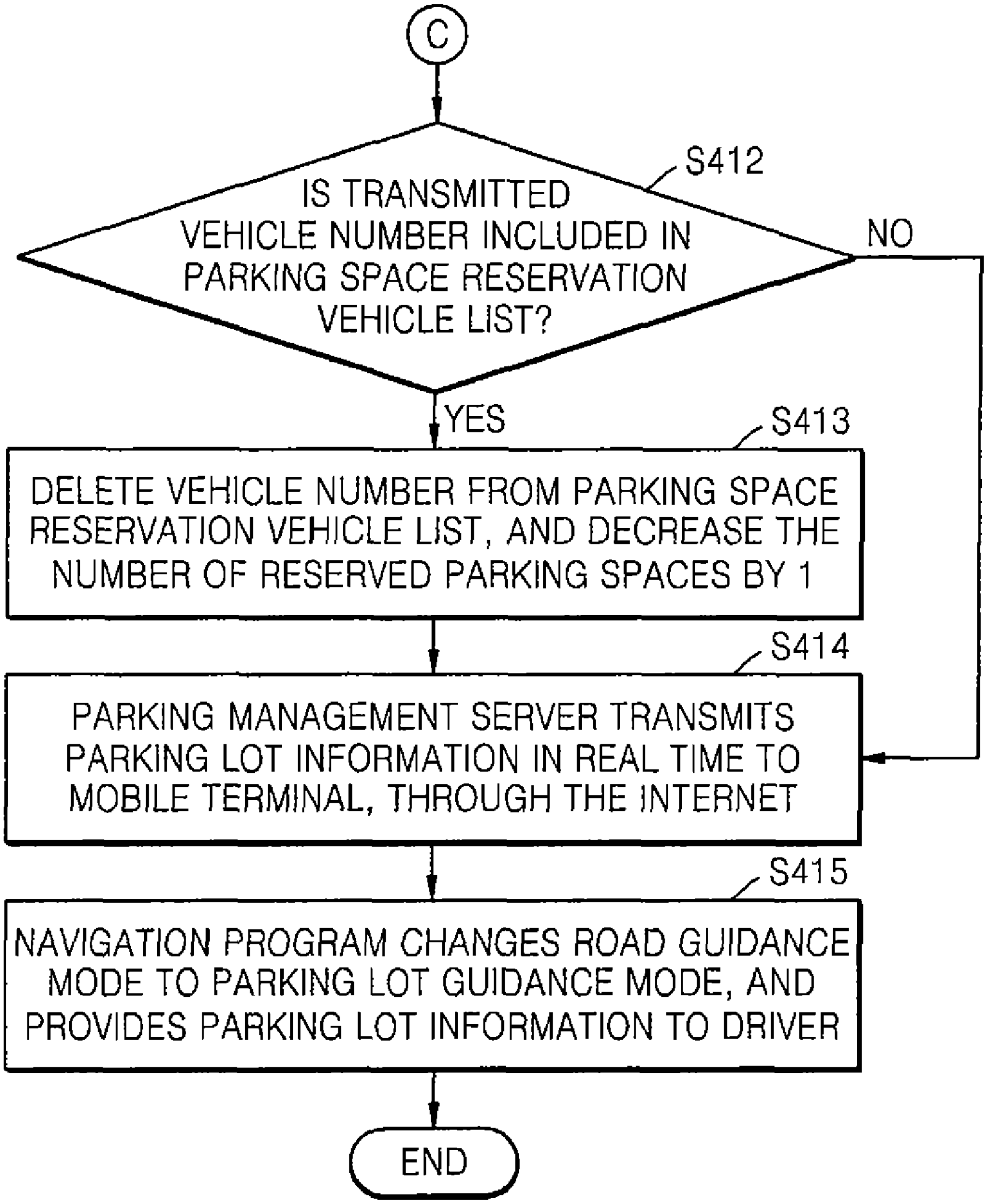

FIGS. 4A and 4B and 4C are flowcharts of a method of providing a parking space reservation service and a parking information providing service in the navigation-linked parking guidance system, according to the embodiment of the present invention.

A vehicle approaches around a destination while a navigation program is being executed by a mobile terminal in the vehicle (operation S401).

The navigation program searches for parking lots which are within a predetermined distance from the destination, using internal POI information (operation S402).

The navigation program extracts IP addresses of parking management servers of intelligent parking guidance systems installed in the searched parking lots, using the POI information, accesses the parking management servers, using the IP addresses, and receives information about the total number of parking spaces and currently available parking spaces of each parking lot in real time from the parking management servers (operation S403).

The navigation program adds the locations of parking lots and the distances from the parking lots to the destination, which are stored therein as the POI information, to the total number of parking spaces and currently available parking spaces of the parking lots, which are transmitted in real time from the parking management servers in operation S403, and informs a driver of the vehicle of this parking lot information (operation 404).

The driver selects a parking lot from among the parking lots on the basis of the parking lot information (operation S405).

The navigation program communicates with a parking management server which is installed in the selected parking lot, and requests the parking management server to reserve a parking space (operation S406).

When the reservation request is transmitted, the navigation program transmits the vehicle number of the number plate of the corresponding vehicle to the corresponding parking management server, and the parking management server uses the vehicle number as a reservation number.

The parking management server which has received the vehicle number adds the vehicle number to a parking space reservation vehicle list of a DB included therein, and increases the number of reserved parking spaces stored in the DB by 1 (operation S407).

Then, the parking management server transmits a message indicating that a reservation procedure is successfully completed, to the navigation program of the mobile terminal. The navigation program parses the message and determines whether the reservation is successfully complete (operation 408).

If it is determined in operation S408 that the reservation is successfully complete, the navigation program automatically changes the destination to the selected parking lot, and continues to provide a road guidance service to the driver. If the reservation procedure fails, the navigation program returns to operation S403 (operation S409).

When the vehicle approaches an entrance of the parking lot due to the road guidance service of the navigation program, an image sensor installed at the entrance of the parking lot senses a number plate of the vehicle and extracts a vehicle number (operation S410).

The vehicle number is transmitted to a parking management server of the parking lot (operation S411).

The parking management server determines whether the vehicle number is included in a parking space reservation vehicle list stored in the DB of the parking management server (operation S412).

If the vehicle is included in the parking space reservation vehicle list, the parking management server deletes the vehicle number from the parking space reservation vehicle list, and decreases the number of reserved parking spaces by 1. If the vehicle is not included in the parking space reservation vehicle list, the navigation program skips ahead to operation S414 (operation S413).

Then, the parking management server transmits parking information of the corresponding parking lot in real time to the vehicle's mobile terminal, through the Internet which is connected to the vehicle's mobile terminal (operation S414). The parking information transmitted to the mobile terminal by the parking management server includes information regarding empty parking spaces on each floor, in each parking section, and for every parking space, and a path to an assigned parking space (see operation 308 of FIG. 3).

After the navigation program of the mobile terminal receives the parking information, the navigation program changes a road guidance mode to a parking lot guidance mode, and provides the parking information received from the parking management server to the driver (operation S415).

So far, the present invention has been described on the basis of the preferred embodiments.

As described above, since an intelligent parking guidance apparatus and method according to the present invention allow a driver to recognize parking lot information in real time through a mobile terminal, and to operate in association with a navigation program, it is possible to guide the driver to a parking lot in which the driver's vehicle can be parked, as well as to provide a road guidance service to the driver.

Also, since, when a vehicle enters a parking lot, a navigation program changes a navigation mode to a parking guidance mode and provides parking information including a path to a specific parking space in the parking lot to the driver of the vehicle to help him or her to easily park his or her vehicle, the driver will not suffer from difficulties in finding a parking space in a place which is unfamiliar to him/her.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. An intelligent parking guidance apparatus comprising:

an image sensor node configured to recognize a vehicle number of a vehicle which enters a parking lot, the parking lot having a plurality of parking spaces;

a plurality of sensor nodes determining whether the vehicle enters or leaves the parking lot and whether the vehicle is parked in the parking lot;

a parking management server configured to determine whether the vehicle is a vehicle which has made a request for parking reservation service using a sensing signal generated by the image sensor node, and generate information to guide the vehicle to the location of an available parking space within the parking lot after the vehicle enters the parking lot using a sensing signal generated by the sensor nodes if the vehicle is identified as having made the request for parking reservation service.

2. The intelligent parking guidance apparatus of claim 1, further comprising:

a mobile communication terminal configured to provide the parking reservation service and guide the vehicle to the available parking space in the parking lot, wherein the mobile communication terminal provides a road guidance service while operating in association with a Global Positioning System (GPS), until the vehicle reaches the parking lot.

3. The intelligent parking guidance apparatus of claim 1, wherein the parking management server provides parking lot information including a total number of parking spaces and currently available empty parking spaces of the parking lot, in real time, to the mobile communication terminal.

4. The intelligent parking guidance apparatus of claim 1, wherein each parking space is assigned with one of the sensor nodes, wherein the parking management server includes location information for each of the sensor nodes that is assigned to the respective parking space, so that the location information can be used to guide the vehicle to the available parking space.

5. The intelligent parking guidance apparatus of claim 1, further comprising at least one sync node configured to amplify the sensing signal generated by the sensor nodes.

6. The intelligent parking guidance apparatus of claim 3, wherein the parking lot information is provided using the Internet.

7. An intelligent parking guidance method comprising:

identifying one or more empty parking spaces in a parking lot that are available for parking using sensors assigned to parking spaces, each parking space being assigned with a sensor and location information;

determining using a processor whether a vehicle entering the parking lot is a vehicle which has made a request to reserve a parking space;

generating location information for use in guiding the vehicle to the location of one of parking spaces identified as being available for parking; and providing the location information to a terminal in the vehicle to guide the vehicle to the available parking space in the parking lot.

8. The intelligent parking guidance method of claim 7, wherein the location information is provided to the terminal in the vehicle after the vehicle enters the parking lot.

9. The intelligent parking guidance method of claim 7, further comprising:

amplifying signals transmitted by the sensors assigned to the parking spaces using a signal amplifier, wherein the location information is provided to the terminal in the vehicle before the vehicle enters the parking lot.

10. The intelligent parking guidance method of claim 8, wherein the parking reservation service is performed using the Internet.

11. An intelligent parking guidance method comprising:

providing a road guidance service to guide a vehicle to a predetermined destination;

providing a parking reservation service, on the basis of location information of parking lots which are within a predetermined distance from the destination, and information of available empty parking spaces of each parking lot, while the road guidance service is provided; and providing using a processor a parking guidance service for guiding the vehicle to an available empty parking space when the vehicle enters a parking lot in which a parking space for the vehicle is reserved by the parking reservation service, wherein the parking guidance service includes providing location information of the available empty parking space within the parking lot to a terminal in the vehicle in order to assist a driver of the vehicle to find the available empty parking space in the parking lot.

* * * * *